UNITED STATES PATENT OFFICE.

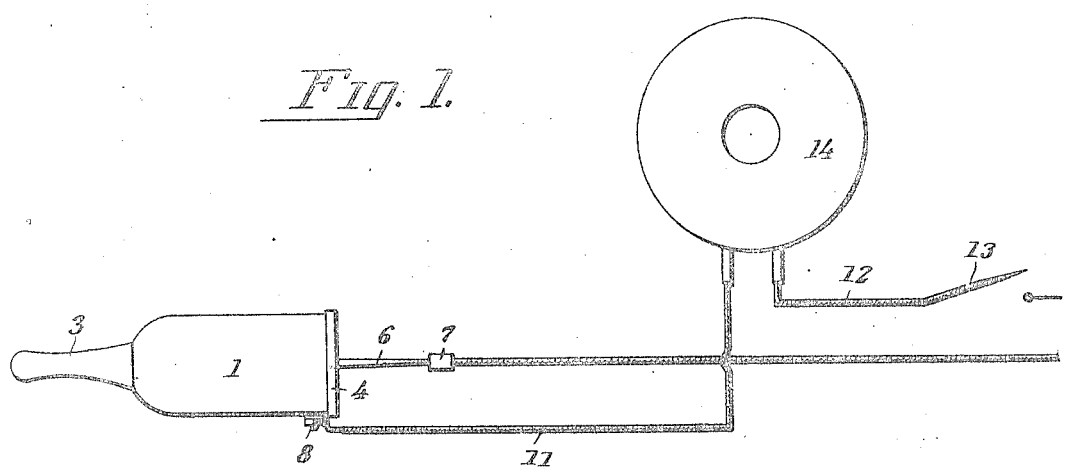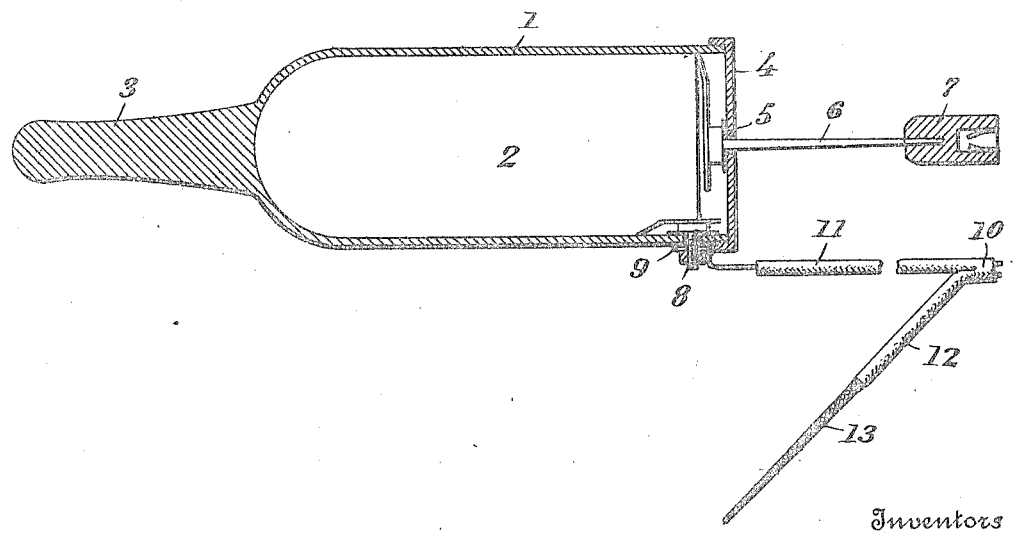

ROYAL H. NICKERSON AND GEORGE G. COURTNEY, OF PLYMOUTH, MASSACHUSETTS.

TESTING DEVICE.

1,208,626.  Specification of Letters Patent.  Patented Dec. 12, 1916.

Application filed July 22, 1913.  Serial No. 780,500.

*To all whom it may concern:*

Be it known that we, ROYAL H. NICKERSON and GEORGE G. COURTNEY, citizens of the United States, residing at Plymouth, in the county of Plymouth and State of Massachusetts, have invented new and useful Improvements in Testing Devices, of which the following is a specification.

This invention relates to improvements in testing devices and has particular application to a device for testing electric circuits.

In carrying out the present invention, it is our purpose to provide a device of the class described whereby the electrical continuity of a circuit may be readily and conveniently ascertained.

Furthermore, we aim to provide a testing device for electric circuits which may be carried about by the lineman in his pocket and which will be comparatively light in weight so that the same may be easily packed away and transported.

It is also our purpose to provide a testing device of the type set forth which will embrace the desired features of simplicity, efficiency and durability, one which may be easily and quickly connected up to the circuit to be tested, and one which may be manufactured and marketed at a minimum expense.

With the above and other objects in view, the invention consists in the construction, combination and arrangement of parts hereinafter set forth in and falling within the scope of the claim.

In the accompanying drawing, Figure 1 is a view in elevation of a testing device constructed in accordance with our present invention. Fig. 2 is a longitudinal sectional view through the casing of the source of energy.

In the practice of our invention, we employ a source of energy having one side connected to one terminal of an electric circuit, a sounder having one side connected to the remaining side of the source of energy, and a serrated terminal member connected to the other side of the sounder and designed to be rubbed over the free terminal of the circuit so that the diaphragm of the sounder or receiver will be vibrated, in the event of the circuit being unbroken, whereby the lineman will be advised as to the condition of the circuit.

Referring now to the accompanying drawing in detail, the numeral 1 designates a suitable casing or housing constructed of any suitable material and designed to receive a suitable source of electrical energy such, for instance, as a small dry cell 2. One end of the housing 1 is closed and formed with an outwardly projecting handle 3, while the opposite end thereof is open and adapted to be closed through the medium of a removable closure or cap 4. Passed through the center of the cap 4 and insulated therefrom as at 5 is a headed pin 6 having the head thereof disposed upon the under side of the cap and the other end terminating a short distance beyond the cap and preferably carrying a clip 7. The headed end of the pin 6 is in contact with one terminal of the dry cell 2 while the opposite terminal of such cell is connected with a binding post 8 passed through the side wall of the casing 1 and insulated therefrom as at 9.

The numeral 10 designates an electric current carrying cord composed of two conductors 11, 12, one terminal of the conductor 11 being tapped onto the binding post 8 while the adjacent terminal of the conductor 12 is equipped with a terminal member 13 in the form of a pin serrated after the fashion of a file or rasp.

The numeral 14 designates a sounder or receiver of any suitable construction connected to the free terminals of the conductors 11 and 12 of the cord 10.

From the foregoing description taken in connection with the accompanying drawing, the construction and manner of employing our invention will be readily apparent. In practice, the clamp or clasp 7 is secured to one terminal of the circuit to be tested, while the serrated terminal member 13 is adapted to be rubbed over the free terminal of such circuit. When the terminal member 13 is in engagement with the respective end of the circuit wire, it will be seen that the source of energy and receiver are connected in series in the circuit so that as the terminal member is rubbed across the adjacent end of the circuit wire, the diaphragm of the receiver or sounder 14 will be vibrated and so notify the lineman that the circuit is intact. On the other hand, if the circuit is interrupted or broken for some reason, the sounder or receiver will refuse to act thereby advising the lineman as to the condition of the circuit.

While we have herein shown and described one preferred form of our invention by way of illustration, we wish it to be understood that we do not limit or confine ourselves to the precise details of construction herein described and delineated, as modification and variation may be made within the scope of the claim without departing from the spirit of the invention.

We claim:

In a device of the class described, in combination a casing, a battery mounted snugly in said casing, said casing having a concavo convex bottom, said battery having a convex bottom snugly fitting the concave side of said casing, said battery projecting in spaced relation from the outer edge of said casing, a cap threaded upon the outer edge of said casing, a contact finger extending transversely in said casing between said cap and battery and secured to the latter, said cap being provided with an opening, the contact member having a conductor rod extending through the opening in said cap, said cap adapted to force the last named contact to bear against the first named contact finger.

In testimony whereof we affix our signatures in presence of two witnesses.

ROYAL H. NICKERSON.
GEORGE G. COURTNEY.

Witnesses:
FREDERICK D. BARTLET,
PHILIP S. BARNES.